Patented Oct. 6, 1925.

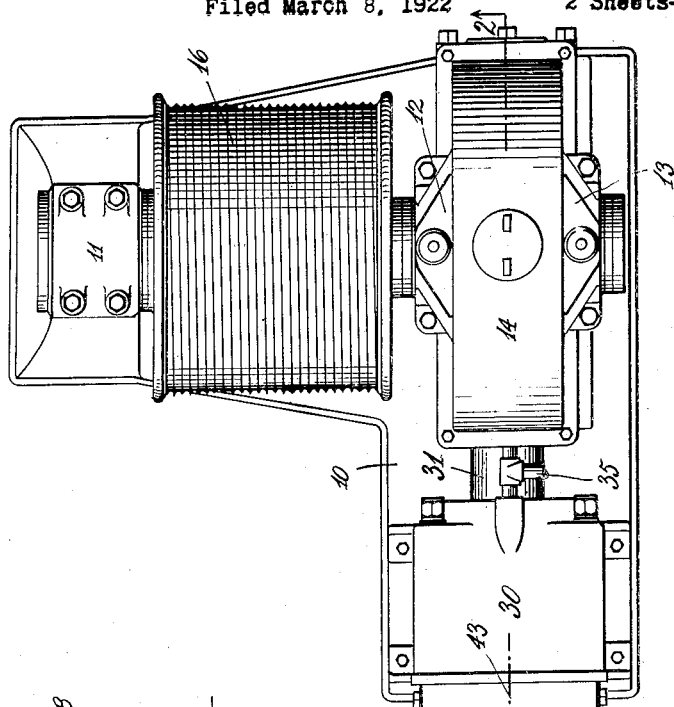

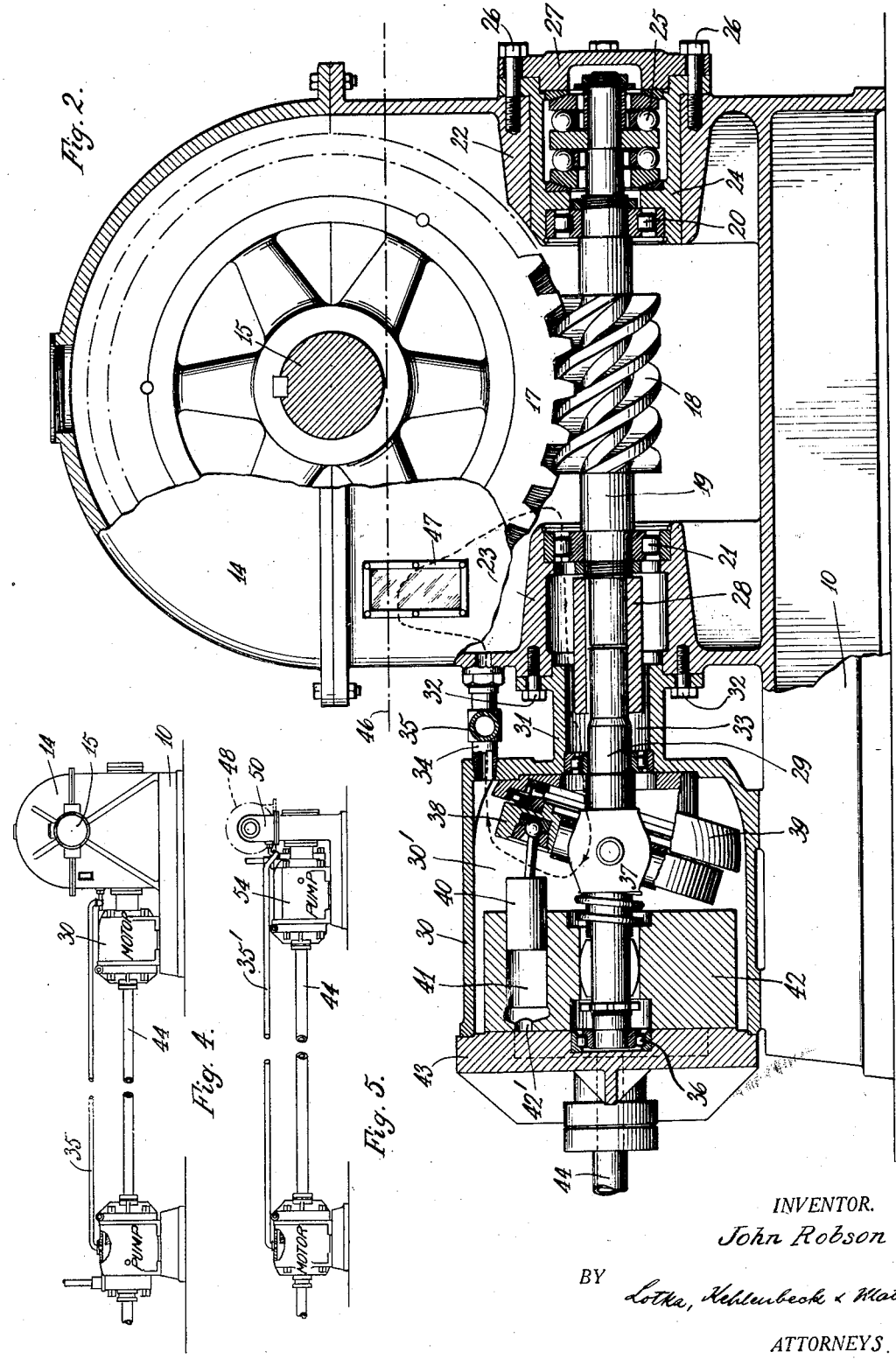

1,556,033

UNITED STATES PATENT OFFICE.

JOHN ROBSON, OF WATERBURY, CONNECTICUT, ASSIGNOR TO UNIVERSAL ENGINEERING CORPORATION, OF MONTREAL, CANADA, A CORPORATION OF CANADA.

HYDRAULIC MECHANISM.

Application filed March 8, 1922. Serial No. 541,902.

*To all whom it may concern:*

Be it known that I, JOHN ROBSON, a subject of the King of Great Britain, and resident of Waterbury, in the county of New Haven and State of Connecticut, have invented certain new and useful Improvements in Hydraulic Mechanisms, of which the following is a specification.

This invention relates to hydraulic mechanisms used in connection with gearing, the latter either driven by the hydraulic mechanism, or driving the same. The invention has been devised primarily for use in connection with hydraulic variable speed gears (consisting of a variable-output pump and a hydraulic motor operated thereby) interposed between a prime mover and the device operated thereby, through the medium of such variable speed gear.

As constructed hitherto, such arrangements have involved the use of stuffing boxes at the points where shafts pass through the casing of the hydraulic mechanism and through the housing of the gearing, in view of the fact that both said casing and said housing contain oil. Considerable difficulty has been experienced in maintaining oiltight joints at these stuffing boxes.

It is one of the objects of the present invention to overcome this difficulty by providing a compact construction in which such stuffing boxes are eliminated. Another object of the invention is to so construct the apparatus that there will be a connection or communication between the interior of the casing of the hydraulic mechanism and the oil space of the gear housing so that the latter will serve as oil expansion space for the hydraulic mechanism.

These objects and the advantages of my invention will appear fully from the description following hereinafter, and the novelty will be pointed out in the appended claims.

Without desiring to restrict myself to the exact details shown, I have illustrated in the accompanying drawings two preferred and satisfactory embodiments of my invention. In these drawings, Fig. 1 shows, in plan view, my invention applied to a ship's winch; Fig. 2 is a vertical section taken substantially on line 2—2 of Fig. 1; Fig. 3 shows partly in vertical section and partly in elevation, a different application of my invention; Fig. 4 is a diagrammatic elevation of a complete hydraulic variable speed gear and mechanism operated thereby, embodying the construction shown in Figs. 1 and 2; and Fig. 5 is a similar view illustrating a general arrangement of parts embodying the construction shown in Fig. 3.

Referring now first to Figs. 1 and 2, 10 represents a base plate having a bearing 11, and also bearings 12, 13 formed in a gear housing 14. The bearings 11, 12, 13 serve to support a shaft 15 carrying, outside of the housing 14, the operated mechanism, in this case a winch drum 16 of any usual or approved construction having grooves for a suitable winch rope or cable (not shown). Inside the housing 14 the shaft 15 carries a worm wheel 17 in mesh with a worm 18 mounted rigidly on a shaft 19 extending, in the particular example shown, at right angles to the shaft 15 and supported in roller bearings 20, 21 located within aligning sleeve-like extensions 22, 23 of the housing 14. The roller bearing 20 is carried by the inner end of a sleeve 24 which also contains a thrust ball-bearing 25 in engagement with one end of the shaft 19. The sleeve 24 is secured to the housing 14 by means of screw bolts 26 which also serve to hold in position a cover or cap 27 closing the outer end of the sleeve 24.

The other end of the shaft 19 is connected rigidly, by means of a coupling sleeve 28, to one end of the driven shaft 29 of a hydraulic motor located in a casing 30. The liquid operating the motor may be propelled through a circulating path by means of a variable output pump located in another casing, such as shown in Fig. 4. Certain features used in connection with the liquid-containing casing (of the pump or of the motor) form part of the present invention and have been illustrated in the drawings. Other details have been omitted as they do not form part of this invention. The construction of hydraulic variable speed gears embodying a combination of pump and motor is well-known and is disclosed for instance in U. S. Letters Patent No. 925,148, dated June 15, 1909.

As shown in Figs. 1 and 2, the motor casing 30 is formed with a sleeve-like extension 31 surrounding the shaft 29, the free end of this extension 31 being connected rigidly with the worm wheel housing 14, as by means of screw bolts 32. The extension 31 forms a continuation of the extension 23 of the worm wheel housing, and it will be seen from Fig. 2 that both extensions are spaced from the coupling sleeve 28 (and therefore from the aligning shafts 19, 29), so as to leave around said coupling sleeve and shafts an annular space 33, through which the interior or fluid-containing space 30' of the speed gear casing communicates with the interior of the worm gear housing. From the upper part of the motor casing 30 a pipe 34 leads into the worm wheel housing, and a second communication (located above the first communication just described) is thus established between the interior spaces of the casing 30 and housing 14 respectively. The pipe 34 has a connection 35 leading to the interior of the casing of the pump part of the variable speed gear either directly as indicated in Fig. 4, or indirectly as referred to below.

The construction of the motor shown in Figs. 1 and 2 is of the character set forth in U. S. Patent No. 925,148 mentioned above and may be outlined as follows: The shaft 29, the inner end of which is supported in a bearing 36, has a universal connection 37 with a ring 38 mounted to rotate on an inclined plate 39 held stationary in the casing 30. With the ring 38 are connected universally the connecting rods of pistons 40 adapted to reciprocate in cylinders 41 formed in a cylinder barrel 42 held to rotate with the shaft 29. The cylinders 41 have ports 42' adapted to register alternately with pressure and suction ports formed in a stationary valve plate 43, which valve plate ports connect with intake and outlet pipes 44, 45 respectively. With this construction it is obvious that when pressure is exerted in one of the pipes 44 or 45, this pressure will be communicated to the cylinders registering at the time with the pressure port. Since the pistons in these cylinders can yield only when the ring 38 yields in the direction of the piston axis, it is clear that a rotary movement of the ring 38 will be produced, owing to the engagement of this ring with the inclined stationary plate 39, which rotation will be imparted to the shaft 29. The pressure and suction in the pipes 44, 45 may be produced in any suitable manner, for instance, by a device similar in construction to the speed gear motor just described, but generally varying therefrom by having the direction and degree of inclination of its plate (corresponding to the plate 39) adjustable. In such a device the pump shaft would be driven in any suitable manner, and pressure and suction would be exerted in the pipes 44, 45 by the reciprocation of the pump pistons through the medium of the rotary ring (corresponding to ring 38).

The liquid used between the pump and motor of the variable speed gear is preferably oil, and for the purpose of proper lubrication and also to replenish the oil supply between pump and motor when required, the whole free space inside the casing 30 is filled with oil, so that all the moving parts run in oil. To insure proper operation of the worm gearing, the worm 18 also preferably runs in oil. By connecting the speed gear casing 30 and the worm gear housing 14 directly, and by providing communication between the interior of the casing and housing, I have not only eliminated the troublesome use of two stuffing boxes, but I have secured the further advantage of doing away with the use of an exposed oil expansion box, which had to be employed formerly and which was liable to be damaged by the winch rope. The worm gear housing now serves as oil expansion box or oil reservoir. The oil level, which must necessarily be above the top of the speed gear casing 30, has been indicated by the line 46 in Fig. 2, and in order to be able to observe this level from the outside and see that it does not fall below the desired height, I have provided in the side wall of the worm gear housing a small window or sight glass 47, which of course has a tight fit in the wall of the housing, so as to prevent leaks at this point.

During operation, the oil in the apparatus will become heated to a certain extent and the heated oil will rise to the top; owing to the fact that there are two connections between the speed gear casing 30 and the worm wheel housing 14 and that these connections are located at different levels, circulation of the oil through the apparatus will take place, the heated oil reaching the oil expansion reservoir in the housing 14 where it will cool off and then again reach the working parts of the device owing to such circulation.

In Fig. 3 I have illustrated my invention as applied to a construction in which the gearing is interposed between the prime mover (say, an electric motor) and the pump of a hydraulic variable speed gear, a worm reduction gear being placed between the drive shaft and the pump shaft. In this figure, 48 represents an electric motor having mounted on its shaft a worm 49 located inside a housing 50 and in mesh with a worm wheel 51 on a shaft 52 supported in bearings 53 and also suitably supported within the pump casing 54 of the variable speed gear. Surrounding the shaft 52, but spaced therefrom, is an extension 55 of the casing 54, which extension is bolted to the worm gear housing 50 as shown at 56. The interior of the casing 54 may be of a construction similar to that of the casing 30 shown in Fig. 2; the inclination of its plate (corresponding to plate 39 of Fig. 2) however would be adjustable by means of an adjusting rod 57. As in the form of my invention first described, there are two connections between the interior of the speed gear casing and the interior of the worm wheel housing, a lower one along shaft 52 and an upper one through a pipe 58 having both its orifices below the oil level indicated at 59.

The operation of the pump part of the speed gear is the reverse of that described in connection with the motor part, that is, the ring (corresponding to the ring 38) is rotated by means of the shaft 52 and by revolving in contact with an (inclined) plate corresponding to the plate 39 in Fig. 2, reciprocates pistons (corresponding to 40) which latter exert pressure and suction in pipes, say the pipes 44, 45 respectively. The speed and direction of rotation of the device is varied by altering the inclination of the plate (corresponding to 39) by means of the adjusting rod 57.

From the pipe 58 a branch connection 35' leads to the oil space of the motor part of the hydraulic variable speed gear, either directly as indicated in Fig. 5, or indirectly, by having one end of the same pipe connect with the pipe 34 as indicated at 35 in Figs. 1 and 2, and the other end of such pipe connect with the pipe 58 as indicated at 35' in Fig. 3. In the latter case, the construction illustrated in Figs. 1 and 2 and the construction shown in Fig. 3 might thus be combined into a single operative device embodying my invention both in connection with the pump and the motor part of a hydraulic variable speed gear.

I claim:

1. In hydraulic mechanism, a casing adapted to contain a liquid, a rotary hydraulic device in said casing, a housing likewise adapted to contain a liquid, and extending upwardly to a level above the uppermost point of said casing, a shaft extending from said casing to said housing and operatively connected with said rotary device, gearing in said housing, connected with said shaft and extending upwardly to a level above the uppermost point of said casing, a connection of tubular character, co-axial with said shaft, through which said casing communicates with said housing, at about the level of mesh of said gearing, and a second connection, located at a higher level, leading from said casing to said housing.

2. In hydraulic mechanism, a casing adapted to contain a liquid, a rotary hydraulic device in said casing, a housing likewise adapted to contain a liquid, and extending upwardly to a level above the uppermost point of said casing, the upper portion of said housing being spaced from said casing, a pipe connecting said spaced upper portions, a tubular connection extending from said casing to said housing below said pipe, gearing located within said housing and extending to a level above the uppermost point of said casing, and a shaft extending through said tubular connection with sufficient looseness to afford a lower path for the circulation of liquid between the casing and the housing, said shaft being connected operatively both with said rotary hydraulic device and with said gearing.

3. In hydraulic mechanism, the combination of a pump comprising a casing and a rotary device therein, a motor likewise comprising a casing and a rotary device therein, a housing located adjacent to one of said casings, gearing within said housing, a shaft connecting said gearing with the rotary device in the adjacent casing, a tubular member forming a lower path for the passage of liquid between such casing and housing, a connection forming an upper path for the passage of liquid between the same casing and housing, a conduit leading from such connection to the other casing, and pipes for the passage of fluid from the pump to the motor and for the return of such fluid from the motor to the pump.

In testimony whereof I have signed this specification.

JOHN ROBSON.